United States Patent
Zhang et al.

(10) Patent No.: US 12,499,577 B2
(45) Date of Patent: Dec. 16, 2025

(54) METHOD AND APPARATUS FOR TESTING STABILITY OF VISION SYSTEM

(71) Applicant: CONTEMPORARY AMPEREX TECHNOLOGY (HONG KONG) LIMITED, Hong Kong (CN)

(72) Inventors: Lei Zhang, Ningde (CN); Guannan Jiang, Ningde (CN); Fei Chen, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/796,302

(22) Filed: Aug. 7, 2024

(65) Prior Publication Data
US 2024/0394916 A1    Nov. 28, 2024

Related U.S. Application Data (63) Continuation of application No. PCT/CN2022/109102, filed on Jul. 29, 2022.

(51) Int. Cl.
*H04N 17/02* (2006.01)
*G06T 3/02* (2024.01)
(Continued)

(52) U.S. Cl.
CPC .................. *G06T 7/74* (2017.01); *G06T 3/02* (2024.01); *G06T 7/13* (2017.01); *G06T 7/62* (2017.01);
(Continued)

(58) Field of Classification Search
CPC ........... H04N 17/002; G06T 7/74; G06T 7/62; G06T 7/13; G06T 3/02; G06T 2207/30108; G06T 2207/30244
(Continued)

(56) References Cited

U.S. PATENT DOCUMENTS 10,579,890 B2 *  3/2020  Polidor ................. H04N 23/67
10,957,072 B2 *  3/2021  Hoelscher .......... G06V 10/7715
(Continued)

FOREIGN PATENT DOCUMENTS

CN    105067226 A    11/2015
CN    106204540 A    12/2016
(Continued)

OTHER PUBLICATIONS

The extended European search report of counterpart EU application 22952510.0, mailed on Dec. 2, 2024, 9 pages.
(Continued)

*Primary Examiner* — Trang U Tran
(74) *Attorney, Agent, or Firm* — K&L Gates LLP (57) ABSTRACT

Embodiments of this application provide a method and apparatus for testing stability of a vision system, which can test whether the vision system is stable, so as to report a fault in a timely manner when the vision system is unstable, thereby guaranteeing accuracy of a measurement result of the vision system. The method includes: obtaining first position information of a spot inspection piece in a current image under the vision system; performing affine transformation on a reference contour model of the spot inspection piece for a position of the spot inspection piece in the current image based on the first position information, and obtaining, through fitting, a current contour model of the spot inspection piece in the current image based on the reference contour model; and determining stability of the vision system based on the reference contour model and the current contour model.

14 Claims, 6 Drawing Sheets

(51) Int. Cl.
    *G06T 7/13*     (2017.01)
    *G06T 7/62*     (2017.01)
    *G06T 7/73*     (2017.01)
    *H04N 17/00*    (2006.01)
(52) U.S. Cl.
    CPC . *H04N 17/002* (2013.01); *G06T 2207/30108* (2013.01); *G06T 2207/30244* (2013.01)
(58) Field of Classification Search
    USPC .......................................................... 348/180
    See application file for complete search history.

(56) References Cited

U.S. PATENT DOCUMENTS

| | | |
|---|---|---|
| 2013/0170731 A1 | 7/2013 | Hirota |
| 2014/0294284 A1 | 10/2014 | Bryll |
| 2019/0180092 A1* | 6/2019 | Foresman ........... G06F 18/2113 |

FOREIGN PATENT DOCUMENTS

| | | |
|---|---|---|
| CN | 111412851 A | 7/2020 |
| CN | 211085009 U | 7/2020 |
| CN | 113804418 A | 12/2021 |

OTHER PUBLICATIONS

International Search Report received in the counterpart international application PCT/CN2022/109102, mailed on Apr. 9, 2023.
Written Opinion of ISA received in the counterpart international application PCT/CN2022/109102, mailed on Apr. 9, 2023.

* cited by examiner

METHOD AND APPARATUS FOR TESTING STABILITY OF VISION SYSTEM

CROSS-REFERENCE TO RELATED APPLICATION

This application is a continuation of International Application No. PCT/CN2022/109102, filed on Jul. 29, 2022, which is hereby incorporated by reference in its entirety.

TECHNICAL FIELD

This application relates to the field of non-contact inspection, and in particular, to a method and apparatus for testing stability of a vision system.

BACKGROUND

In most conventional cases, dimensions of industrial parts are inspected manually by using, for example, contact instruments such as a film ruler or a spot inspection cavity, thereby leading to high labor costs, low inspection accuracy, and low efficiency, which makes it difficult to implement high-speed online inspection.

In recent years, machine vision systems have gradually replaced manual inspection in many fields, and have been widely used in production process control and product quality inspection. However, when a machine vision system is unstable, for example, a camera position changes, accuracy of a measurement result will be affected. Therefore, a method for testing stability of a vision system is urgently needed to guarantee accuracy of a measurement result of the vision system.

SUMMARY

This application provides a method for testing stability of a vision system, which can test whether the vision system is stable, so as to report a fault in a timely manner when the vision system is unstable, thereby guaranteeing accuracy of a measurement result of the vision system.

According to a first aspect, this application provides a method for testing stability of a vision system including: obtaining first position information of a spot inspection piece in a current image under the vision system; performing affine transformation on a reference contour model of the spot inspection piece for a position of the spot inspection piece in the current image based on the first position information, and obtaining, through fitting, a current contour model of the spot inspection piece in the current image based on the reference contour model; and determining stability of the vision system based on the reference contour model and the current contour model.

In technical solutions of embodiments of this application, the reference contour model of the spot inspection piece is subjected to the affine transformation for the position of the spot inspection piece in the current image under the vision system, the approximate matching of the current contour model can be implemented, then the accurate current contour model can be obtained through fitting, and it can be seen, by comparing the current contour model with the reference contour model, whether the current contour model has changed compared with the reference contour model, so as to test whether the vision system is stable and report a fault in a timely manner when the vision system is unstable, thereby guaranteeing the accuracy of the measurement result of the vision system.

In some embodiments, before the performing affine transformation on a reference contour model of the spot inspection piece for a position of the spot inspection piece in the current image, the method further includes: obtaining the reference contour model based on a reference image of the spot inspection piece; and obtaining second position information of the spot inspection piece in the reference image; where the performing affine transformation on a reference contour model of the spot inspection piece for a position of the spot inspection piece in the current image includes: performing affine transformation on the reference contour model of the spot inspection piece for the position of the spot inspection piece in the current image based on the first position information and the second position information.

The second position information of the spot inspection piece in the reference image is obtained, so that the position information of the reference contour model can be obtained, that is, a position of the reference contour model is the same as that of the spot inspection piece in the reference image. In this way, the reference contour model can be subjected to the affine transformation for the position of the spot inspection piece in the current image based on the second position information and the first position information of the spot inspection piece in the current image, so as to implement approximate matching of the contour model.

In some embodiments, the spot inspection piece includes at least one rectangular frame, and each rectangular frame includes a circle and a grayscale region outside the circle; and the reference contour model and the current contour model include contours of the rectangular frame and the circle.

Because the circle has only one linear dimension value, that is, the diameter, in comparison with another polygon of which each side dimension needs to be measured, workload of measurement can be reduced, which facilitates quick comparison based on measured values to determine whether the camera position of the vision system has changed.

In some embodiments, a plurality of rectangular frames are present, a plurality of circles corresponding to the plurality of rectangular frames have different diameters, and a plurality of grayscale regions corresponding to the plurality of rectangular frames have different grayscale values.

A plurality of diameters of different circles and grayscale values of different grayscale regions in the reference contour model and the current contour model are compared, which can increase the accuracy of testing the stability of the vision system.

In some embodiments, one rectangular frame in the spot inspection piece includes a notch, and the notch is configured to indicate a direction of the spot inspection piece. The direction of the spot inspection piece is indicated through the notch, so that the approximate matching can be implemented at a higher matching degree before the current contour model is obtained through fitting based on the reference contour model, which can reduce the time required for fitting to obtain the current contour model, thereby increasing a speed of testing the stability of the vision system.

In some embodiments, the obtaining, through fitting, a second circle of the current contour model based on a first circle in the reference contour model includes: obtaining, through fitting, a second circle of the current contour model based on a first circle in the reference contour model.

When the current contour model is subjected to fitting, only the second circle of the current contour model needs to be obtained through fitting, to learn of parameters needed for testing the stability of the vision system, namely, the diameter of the circle and the grayscale value of the grayscale region, that is, the contour of the rectangular frame does not need fitting, which reduces time for obtaining the parameters needed for testing the stability of the vision system, thereby improving the efficiency of testing the stability of the vision system.

In some embodiments, the obtaining, through fitting, a second circle of the current contour model based on a first circle in the reference contour model includes: obtaining a plurality of pixel points with significant grayscale value changes in the current image based on a contour of the first circle, where the plurality of pixel points with significant grayscale value changes form the second circle.

Compared with a manner of directly obtaining pixel points with significant pixel changes in the current image, the manner of obtaining pixel points with significant pixel changes based on the contour of the first circle not only reduces the time required for obtaining the pixel points, but also increases the accuracy of obtaining the pixel points, thereby improving the efficiency and accuracy of fitting to obtain the second circle.

In some embodiments, the determining stability of the vision system based on the reference contour model and the current contour model includes: obtaining a diameter of the first circle based on the reference contour model; obtaining a diameter of the second circle based on the current contour model; and determining, based on the diameter of the first circle and the diameter of the second circle, whether a camera position of the vision system has changed.

Compared with a manner of using another dimension of the circle, for example, a perimeter, the manner of comparing the diameter of the first circle with the diameter of the second circle to determine whether the camera position of the vision system has changed is more intuitive and is conducive to a quick test of the stability of the vision system.

In some embodiments, the determining, based on the diameter of the first circle and the diameter of the second circle, whether a camera position of the vision system has changed includes: if a difference between the diameter of the first circle and the diameter of the second circle is greater than a first threshold, determining that the camera position has changed. Setting the first threshold can satisfy different requirements of different customers for measurement accuracy.

In some embodiments, the obtaining a diameter of the second circle based on the current contour model includes: calculating a size of each pixel based on the diameter of the first circle and the number of pixels included in the diameter of the first circle; obtaining the number of pixels included in the diameter of the second circle based on a contour of the second circle; and calculating the diameter of the second circle based on the number of pixels included in the diameter of the second circle and the size of each pixel.

In the vision system, the size of each pixel in reference is calculated by using a value of the diameter of the first circle in the reference image and the number of pixels included in the diameter. When the second circle in the current image is obtained through fitting, the diameter of the second circle can be directly obtained by counting the number of pixels included in the diameter of the second circle, so as to compare the diameter of the second circle with the diameter of the first circle and quickly determine whether the camera position of the vision system has changed, thereby testing the stability of the vision system.

In some embodiments, the determining stability of the vision system based on the reference contour model and the current contour model further includes: obtaining, based on the reference contour model, a first grayscale value of a grayscale region corresponding to the first circle; obtaining, based on the current contour model, a second grayscale value of a grayscale region corresponding to the second circle; and determining, based on the first grayscale value and the second grayscale value, whether illumination in the vision system has changed.

Currently, when a change in the illumination of the vision system is excessively great, size measurement is slightly affected. For example, when the illumination is excessively great, an edge of an image taken for a target object is recessed inward, and a measured size is smaller. The first grayscale value of the reference contour model is compared with the second grayscale value of the current contour model, which is conducive to testing of whether the illumination of the vision system has changed, so as to prevent excessively great illumination change, which otherwise affects the accuracy of the measurement result.

In some embodiments, the determining, based on the first grayscale value and the second grayscale value, whether illumination in the vision system has changed includes: if a difference between the first grayscale value and the second grayscale value is greater than a second threshold, determining that the illumination has changed. Setting of the second threshold can satisfy different requirements of different customers for a change degree of the illumination environment of the vision system.

In some embodiments, the first position information and the second position information include row information, column information, and angle information of the spot inspection piece, and the angle information is used to indicate the direction of the spot inspection piece.

The first position information and the second position information include not only the conventional row information and column information, but also the angle information indicating the direction of the spot inspection piece, so that approximate matching of the current contour model can be implemented during the affine transformation to obtain the accurate current contour model through fitting, regardless of how the spot inspection piece is placed before the reference contour model is stored, that is, it is unnecessary to place the spot inspection piece at a fixed angle each time before the stability of the vision system is tested, which is conducive to the quick testing of the stability of the vision system.

According to a second aspect, this application provides an apparatus for testing stability of a vision system, including: an obtaining unit, configured to obtain first position information of a spot inspection piece in a current image under the vision system; and a processing unit, configured to: perform affine transformation on a reference contour model of the spot inspection piece for a position of the spot inspection piece in the current image based on the first position information, and obtain, through fitting, a current contour model of the spot inspection piece in the current image based on the reference contour model; and determine stability of the vision system based on the reference contour model and the current contour model.

In the technical solution of this embodiment of this application, the reference contour model of the spot inspection piece is subjected to the affine transformation for the position of the spot inspection piece in the current image under the vision system, the approximate matching of the current contour model can be implemented, then the accurate current contour model can be obtained through fitting, and it can be seen, by comparing the current contour model with the reference contour model, whether the current contour model has changed compared with the reference contour model, to detect whether the vision system is stable and report a fault in a timely manner when the vision system is unstable, thereby guaranteeing the accuracy of the measurement result of the vision system.

In some embodiments, the obtaining unit is further configured to: obtain the reference contour model based on a reference image of the spot inspection piece; and obtain second position information of the spot inspection piece in the reference image; and the processing unit is further configured to perform affine transformation on the reference contour model of the spot inspection piece for the position of the spot inspection piece in the current image based on the first position information and the second position information.

The second position information of the spot inspection piece in the reference image is obtained, so that the position information of the reference contour model can be obtained, that is, a position of the reference contour model is the same as that of the spot inspection piece in the reference image. In this way, the reference contour model can be subjected to the affine transformation for the position of the spot inspection piece in the current image based on the second position information and the first position information of the spot inspection piece in the current image, to implement the approximate matching of the contour model.

In some embodiments, the spot inspection piece includes at least one rectangular frame, and each rectangular frame includes a circle and a grayscale region outside the circle; and the reference contour model and the current contour model include contours of the rectangular frame and the circle.

Because the circle has only one linear dimension value, that is, the diameter, in comparison with another polygon of which each side dimension needs to be measured, workload of measurement can be reduced, which facilitates quick comparison based on measured values to determine whether the camera position of the vision system has changed.

In some embodiments, a plurality of rectangular frames are present, a plurality of circles corresponding to the plurality of rectangular frames have different diameters, and a plurality of grayscale regions corresponding to the plurality of rectangular frames have different grayscale values.

A plurality of diameters of different circles and grayscale values of different grayscale regions in the reference contour model and the current contour model are compared, which can increase the accuracy of testing the stability of the vision system.

In some embodiments, one rectangular frame in the spot inspection piece includes a notch, and the notch is configured to indicate a direction of the spot inspection piece. The direction of the spot inspection piece is indicated through the notch, so that the approximate matching can be implemented at a higher matching degree before the current contour model is obtained through fitting based on the reference contour model, which can reduce the time required for fitting to obtain the current contour model, thereby improving a speed of testing the stability of the vision system.

In some embodiments, the processing unit is further configured to obtain, through fitting, a second circle of the current contour model based on a first circle in the reference contour model.

In some embodiments, the obtaining unit is further configured to obtain a plurality of pixel points with significant grayscale value changes in the current image based on a contour of the first circle, where the plurality of pixel points with significant grayscale value changes form the second circle.

When the current contour model is subjected to fitting, only the second circle of the current contour model needs to be obtained through fitting, to learn of parameters needed for testing the stability of the vision system, namely, the diameter of the circle and the grayscale value of the grayscale region, that is, the contour of the rectangular frame does not need fitting, which reduces time for obtaining the parameters needed for testing the stability of the vision system, thereby improving the efficiency of testing the stability of the vision system.

In some embodiments, the obtaining unit is further configured to: obtain a diameter of the first circle based on the reference contour model, and obtain a diameter of the second circle based on the current contour model; and the processing unit is further configured to determine, based on the diameter of the first circle and the diameter of the second circle, whether a camera position of the vision system has changed.

Compared with a manner of using another dimension of the circle, for example, a perimeter, the manner of comparing the diameter of the first circle with the diameter of the second circle to determine whether the camera position of the vision system has changed is more intuitive and is conducive to a quick test of the stability of the vision system.

In some embodiments, the processing unit is further configured to: if a difference between the diameter of the first circle and the diameter of the second circle is greater than a first threshold, determine that the camera position has changed. Setting the first threshold can satisfy different requirements of different customers for measurement accuracy.

In some embodiments, the processing unit is further configured to calculate a size of each pixel based on the diameter of the first circle and the number of pixels included in the diameter of the first circle; the obtaining unit is further configured to obtain the number of pixels included in the diameter of the second circle based on a contour of the second circle; and the processing unit is further configured to calculate the diameter of the second circle based on the number of pixels included in the diameter of the second circle and the size of each pixel.

In the vision system, the size of each pixel in reference is calculated by using a value of the diameter of the first circle in the reference image and the number of pixels included in the diameter. When the second circle in the current image is obtained through fitting, the diameter of the second circle can be directly obtained by counting the number of pixels included in the diameter of the second circle, so as to compare the diameter of the second circle with the diameter of the first circle and quickly determine whether the camera position of the vision system has changed, thereby testing the stability of the vision system.

In some embodiments, the obtaining unit is further configured to: obtain, based on the reference contour model, a first grayscale value of a grayscale region corresponding to the first circle; and obtain, based on the current contour model, a second grayscale value of a grayscale region corresponding to the second circle; and the processing unit is further configured to determine, based on the first grayscale value and the second grayscale value, whether illumination in the vision system has changed.

Currently, when a change in the illumination of the vision system is excessively great, size measurement is slightly affected. For example, when the illumination is excessively great, an edge of an image taken for a target object is recessed inward, and a measured size is smaller. The first grayscale value of the reference contour model is compared with the second grayscale value of the current contour model, which is conducive to testing of whether the illumination of the vision system has changed, so as to prevent excessively great illumination change, which otherwise affects the accuracy of the measurement result.

In some embodiments, the processing unit is further configured to: if a difference between the first grayscale value and the second grayscale value is greater than a second threshold, determine that the illumination has changed. Setting of the second threshold can satisfy different requirements of different customers for a change degree of the illumination environment of the vision system.

In some embodiments, the first position information and the second position information include row information, column information, and angle information of the spot inspection piece, and the angle information is used to indicate the direction of the spot inspection piece.

The first position information and the second position information include not only the conventional row information and column information, but also the angle information indicating the direction of the spot inspection piece, so that approximate matching of the current contour model can be implemented during the affine transformation to obtain the accurate current contour model through fitting, regardless of how the spot inspection piece is placed before the reference contour model is stored, that is, it is unnecessary to place the spot inspection piece at a fixed angle each time before the stability of the vision system is tested, which is conducive to the quick testing of the stability of the vision system.

According to a third aspect, an embodiment of this application provides an apparatus for testing stability of a vision system including: a processor and a memory, where the memory is configured to store a program, and the processor is configured to call and run the program from the memory to perform the method for testing stability of a vision system according to the foregoing first aspect or any possible implementation of the first aspect.

According to a fourth aspect, an embodiment of this application provides a computer-readable storage medium including a computer program, where when the computer program runs on a computer, the computer is enabled to perform the method for testing stability of a vision system according to the foregoing first aspect or any possible implementation of the first aspect.

According to a fifth aspect, an embodiment of this application provides a computer program product including instructions, where when the instructions are executed by a computer, the computer is enabled to perform the method for detecting stability of a version system according to the foregoing first aspect or any possible implementation of the first aspect.

The foregoing description is merely an overview of the technical solution of this application. For a better understanding of the technical means in this application such that they can be implemented according to the content of the specification, and to make the above and other objectives, features and advantages of this application more obvious and easier to understand, the following describes specific embodiments of this application.

BRIEF DESCRIPTION OF DRAWINGS

To describe the technical solutions of the embodiments of this application more clearly, the following briefly describes the accompanying drawings required for describing the embodiments of this application. Apparently, the accompanying drawings described below show merely some embodiments of this application, and persons of ordinary skill in the art may still derive other drawings from the accompanying drawings without creative efforts.

The accompanying drawings are not drawn to scale.

DESCRIPTION OF EMBODIMENTS

The following describes in detail the embodiments of technical solutions of this application with reference to the accompanying drawings. The following embodiments are merely intended for a clearer description of the technical solutions of this application and therefore are used as just examples which do not constitute any limitations on the protection scope of this application.

Unless otherwise defined, all technical and scientific terms used herein shall have the same meanings as commonly understood by persons skilled in the art to which this application relates. The terms used herein are intended to merely describe the specific embodiments rather than to limit this application. The terms "include", "have", and any other variations thereof in the specification, claims and brief description of drawings of this application are intended to cover non-exclusive inclusions.

In the description of the embodiments of this application, the terms "first", "second" and the like are merely intended to distinguish between different objects, and shall not be understood as any indication or implication of relative importance or any implicit indication of the number, sequence or primary-secondary relationship of the technical features indicated. In the description of the embodiments of this application, "a plurality of" means "at least two" unless otherwise specifically stated.

In this specification, reference to "embodiment" means that specific features, structures or characteristics described with reference to the embodiment may be incorporated in at least one embodiment of this application. The word "embodiment" appearing in various places in this specification does not necessarily refer to the same embodiment or an independent or alternative embodiment that is exclusive of other embodiments. It is explicitly or implicitly understood by persons skilled in the art that the embodiments described herein may be combined with other embodiments.

Currently, in the vision system, an industrial camera can be used to replace human eyes to complete functions such as recognition, measurement, and positioning. The vision system is generally composed of a camera and a light source, and can replace labor to complete inspection of barcode characters and cracks, and intactness, a dent, and a dimension of a package and a surface coating. Using the vision system can effectively improve an inspection speed and inspection accuracy of a production line, which greatly improves yield and quality, reduces labor costs, and prevents misjudgment caused due to a human factor. Therefore, the vision system has been widely used to control production processes and inspect product quality. When the vision system is used to measure a size of a workpiece or another target object, if a camera position is changed or illumination is excessively greatly changed, accuracy of a size measurement result is affected. Therefore, to guarantee accuracy and effectiveness of the measurement result, the stability of the vision system needs to be tested each time before the vision system is used.

In view of the foregoing problems, embodiments of this application propose a method for testing stability of a vision system. Specifically, a spot inspection piece is designed, and a contour model of the spot inspection piece in the current image is compared with that of the spot inspection piece in the reference image, to test the stability of the vision system. The contour model can include different figures. By measuring a size change of the figure, it can be determined whether the camera position in the vision system has changed, and by measuring a grayscale value change of the figure, it can be determined whether illumination has changed, to report a fault in a timely manner when the change occurs, thereby guaranteeing accuracy of a measurement result of the vision system.

The method for testing stability of a vision system disclosed in the embodiments of this application is a general testing method, and may be applied to various vision systems including cameras and light sources, for example, a battery defect detection vision system, a battery size measurement vision system, and an electrode plate testing vision system. The method may certainly be further applied to, in addition to the foregoing battery detection vision system, a vision system for testing another workpiece, for example, a display screen or a bearing. This is not limited in this application.

Figure 1:
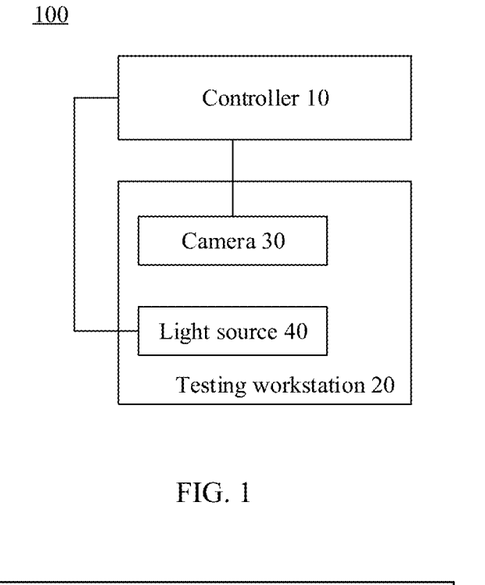
FIG. 1 is a schematic structural diagram of a system architecture according to an embodiment of this application.

FIG. 1 is a schematic structural diagram of a vision system architecture to which the embodiments of this application are applicable. As shown in FIG. 1, a vision system 100 includes a controller 10 and at least one testing workstation 20, each testing workstation includes a camera 30 and a plurality of light sources 40, light emitting surfaces of the plurality of light sources 40 face toward a surface of a target object corresponding to each testing workstation 20, and the controller 10 is connected to the camera 30 and plurality of light sources 40 of each testing workstation 20.

The camera 30 may alternatively be another image collection device with an image collection function, for example, a webcam. In each testing workstation 20, the camera 30 is at a position at a preset height away from the surface of the target object corresponding to each testing workstation 20. The light source may be a light emitting strip or another type of light source.

The controller 10 may be a terminal such as a mobile phone terminal, a tablet computer, or a notebook computer, or may alternatively be a server or a cloud. The controller 10 may include a calculation module and a data storage system. The calculation module may be configured to process received input data (for example, a to-be-processed image). When the calculation module performs related processing, the controller 10 may call data, code and the like from the data storage system to perform corresponding processing, and may also store, into the data storage system, the data and instructions obtained through the corresponding processing.

When a size of the target object is measured, a spot inspection piece can be put at the testing workstation 20, the spot inspection piece can be put next to the target object, and then the size of the target object is measured by using the spot inspection piece with a known size as a caliper. In this process, the camera 20 is configured to collect images of the spot inspection piece and the target object. The controller 10 is configured to measure the size of the target object through the spot inspection piece and a related algorithm.

When the stability of the vision system 100 is tested in this embodiment of this application, the controller 10 is further configured to compare the spot inspection piece in a current image captured by the camera 20 with a spot inspection piece originally stored by the controller 10, and if the spot inspection piece in the current image and the spot inspection piece originally stored are different or exceed a preset value to different extents, it is determined that the stability of the vision system 100 has changed. When the vision system 100 is unstable, the controller 10 can send fault information such as NG to indicate that the vision system 100 is unstable or needs calibration, thereby guaranteeing the accuracy of the testing result of the vision system 100.

Figure 2:
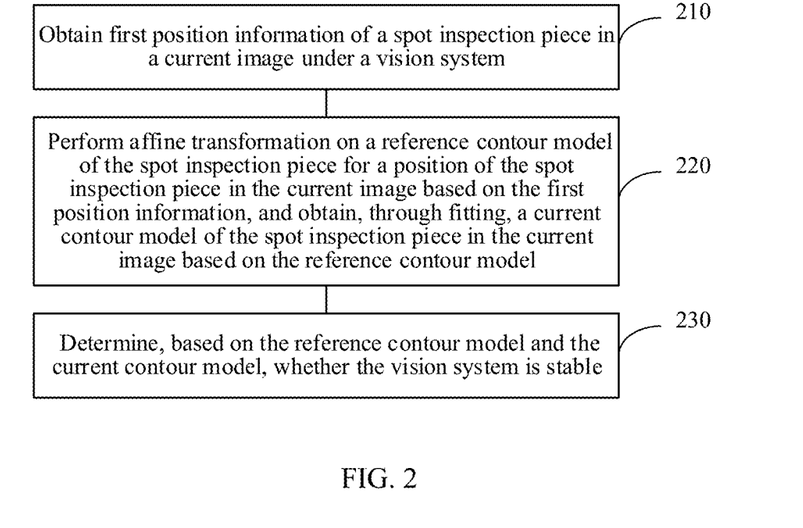
FIG. 2 is a schematic flowchart of a method for testing stability of a vision system according to an embodiment of this application.

A method 200 for testing stability of a vision system provided in the embodiments of this application is described in detail below with reference to FIG. 2. FIG. 2 is a schematic flowchart of a method for testing stability of a vision system according to an embodiment of this application. The method may be performed by an apparatus for testing stability of a vision system, and the apparatus may be the controller 10 in FIG. 1. The method 200 includes at least some of the following content.

S210. An apparatus for testing stability of a vision system obtains first position information of a spot inspection piece in a current image under the vision system.

The vision system may be the vision system 100 in FIG. 1. The vision system can measure a size of a target object through a spot inspection piece. The target object may be any workpiece such as a battery cell, a bolt, or a display screen, or may be a defect of the workpiece. A height of the camera in the vision system can be set based on a surface area of the target object for which collection is required. Larger area for which collection is required leads to higher position of the camera.

The current image may be an image of the spot inspection piece captured by a camera of the vision system under illumination of a current light source before the size of the target object is measured through the vision system. The first position information may include row information, column information, and angle information of the spot inspection piece in a coordinate system of the image.

S220. The apparatus for testing stability of a vision system performs affine transformation on a reference contour model of the spot inspection piece for a position of the spot inspection piece in the current image based on the first position information, and obtains, through fitting, a current contour model of the spot inspection piece in the current image based on the reference contour model.

The affine transformation is a linear transformation from two-dimensional coordinates (x, y) to two-dimensional coordinates (u, v). The affine transformation maintains "straightness" (straight lines are still straight lines after being subjected to the affine transformation) and "parallelism" (a relative positional relationship between straight lines remains unchanged, parallel lines are still parallel lines after being subjected to the affine transformation, and positional sequences of points on the straight lines are not changed) of a two-dimensional image. Therefore, to accurately obtain the current contour model of the spot inspection piece in the current image, the reference contour model can be first subjected to the affine transformation for the position of the spot inspection piece in the current image, to learn of an approximate contour of the current contour model, that is, to implement approximate matching or rough matching of the contour model, so that the accurate current contour model can be subsequently obtained through fitting based on the approximately matched contour model.

S230. The apparatus for testing stability of a vision system determines stability of the vision system based on the reference contour model and the current contour model.

In the technical solution of this embodiment of this application, the reference contour model of the spot inspection piece is subjected to the affine transformation for the position of the spot inspection piece in the current image under the vision system, the approximate matching of the current contour model can be implemented through the reference contour model at this position, then the accurate current contour model can be obtained through fitting, and it can be seen, by comparing the current contour model with the reference contour model, whether the current contour model has changed compared with the reference contour model, to detect whether the vision system is stable and report a fault in a timely manner when the vision system is unstable, thereby guaranteeing the accuracy of the measurement result of the vision system.

According to some embodiments of this application, optionally, before the apparatus for testing stability of a vision system performs the affine transformation on the reference contour model of the spot inspection piece for the position of the spot inspection piece in the current image in the foregoing step 220, the apparatus for testing stability of a vision system can further obtain the reference contour model based on the reference image of the spot inspection piece, obtain second position information of the spot inspection piece in the reference image, and then perform the affine transformation on the reference contour model of the spot inspection piece for the position of the spot inspection piece in the current image based on the first position information and the second position information.

To perform the affine transformation on the reference contour model for the position of the spot inspection piece in the current image, it is necessary to learn of position information of the reference contour model and the position information (first position information) of the spot inspection piece in the current image in advance. Because the spot inspection piece of the reference image includes the reference contour model, the position information of the reference contour model can be learned through the position information of the spot inspection piece in the reference image. The reference image of the spot inspection piece may be regarded as an image of the spot inspection piece captured by the vision system when a testing caliper standard is embedded.

The reference contour model may be a contour model formed by connecting pixel points that are manually marked on the spot inspection piece of the reference image and have grayscale values changing significantly after the reference image is captured.

The second position information of the spot inspection piece in the reference image is obtained, so that the position information of the reference contour model can be obtained, that is, a position of the reference contour model is the same as that of the spot inspection piece in the reference image. In this way, the reference contour model can be subjected to the affine transformation for the position of the spot inspection piece in the current image based on the second position information and the first position information of the spot inspection piece in the current image, to implement the approximate matching of the current contour model, thereby improving efficiency of obtaining, through fitting, the current contour model.

According to some embodiments of this application, optionally, before the apparatus for testing stability of a vision system performs the affine transformation on the reference contour model for the position of the spot inspection piece in the current image, the reference contour model can alternatively be stored at an origin point of a coordinate system. Specifically, firstly, the reference contour model is obtained based on the reference image of the spot inspection piece, and the second position information of the spot inspection piece in the reference image, namely, the position information of the reference contour model, is obtained. For example, the second position information is denoted as (R, C, A), where R represents a row at which a center point of the spot inspection piece is located, C represents a column at which the center point of the spot inspection piece is located, and A represents a placement angle of the spot inspection piece. Then, the reference contour model is subjected to the affine transformation for the origin point of the coordinate system based on the second position information, and the reference contour model at the origin point is stored. According to this embodiment, when step 220 is performed, it is unnecessary to learn of the position information of the reference contour model in advance, and therefore, the vision system does not need to store or record the position information of the reference contour model. During the affine transformation, it is only necessary to perform the affine transformation on the reference contour model at the origin point for the position of the spot inspection piece in the current image based on the first position information.

Figure 3:
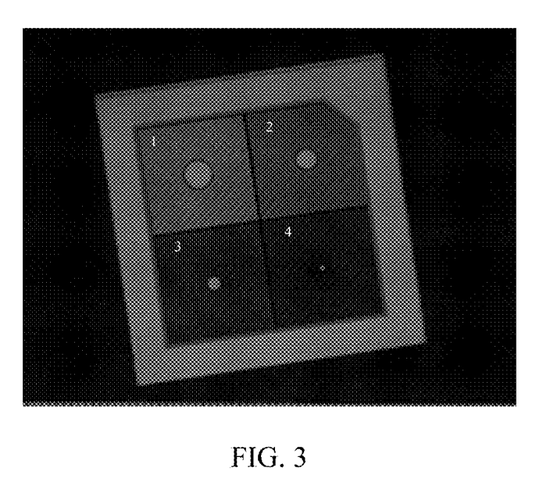
FIG. 3 is a schematic structural diagram of a spot inspection piece according to an embodiment of this application.

According to some embodiments of the application, optionally, the spot inspection piece can include at least one rectangular frame, and each rectangular frame includes a circle and a grayscale region outside the circle; and the reference contour model and the current contour model include contours of the rectangular frame and the circle. For example, FIG. 3 shows an image of a spot inspection piece. The spot inspection piece includes four rectangular frames. Taking the rectangular frame 1 as an example, a region outside the circle in the rectangular frame is the grayscale region, and a grayscale region of another rectangular frame is similar. The circle in the rectangular frame may be used as an image for measuring a size of the spot inspection piece, and the grayscale region is used as an image for measuring a grayscale value of the spot inspection piece.

When the current contour model is obtained through fitting, a size of the circle in the current contour model is compared with that of a circle in the reference contour, and therefore, it can be determined whether the camera position of the vision system has changed. The grayscale value of the grayscale region in the current contour is compared with the grayscale value of the grayscale region in the reference contour, and therefore, it can be determined whether the illumination of the vision system has changed.

Because the circle has only one linear dimension value, that is, the diameter, in comparison with another polygon of which each side dimension needs to be measured, workload of measurement can be reduced, which facilitates quick comparison based on measured values to determine whether the camera position of the vision system has changed.

According to some embodiments of this application, optionally, as shown in FIG. 3, when a plurality of rectangular frames are present, a plurality of circles corresponding to the plurality of rectangular frames have different diameters, and a plurality of grayscale regions corresponding to the plurality of rectangular frames have different grayscale values. A plurality of diameters of different circles and grayscale values of different grayscale regions in the reference contour model and the current contour model are compared, which can increase the accuracy of testing the stability of the vision system.

According to some embodiments of this application, optionally, one rectangular frame in the spot inspection piece includes a notch, and the notch is configured to indicate a direction of the spot inspection piece.

As shown in FIG. 3, rectangular frame 2 has a notch at an upper right corner, and the notch may be, for example, in a shape of a triangle in FIG. 3 or another shape, as long as the notch can indicate the direction of the spot inspection piece. This is not limited in this application.

The notch indicates the direction of the spot inspection piece or an angle of deviating from a coordinate axis. In this way, not only the approximate contour of the current contour model is obtained through matching by using row information and column information, but also the direction information of the spot inspection piece is also added, to quickly and accurately obtain the current contour model through fitting, thereby improving the efficiency of testing the stability of the system.

According to some embodiments of this application, optionally, the apparatus for testing stability of a vision system can obtain, through fitting, a second circle of the current contour model based on a first circle in the reference contour model.

Taking circles (referred to as circles 1 below) in rectangular frame 1 in FIG. 3 as an example, circle 1 in the reference contour model is the first circle and circle 1 in the current contour model is the second circle, and it should be understood that the first circle and the second circle are only used to distinguish the same circle at the same position in the reference image. After the reference contour model is subjected to the affine transformation for the first position, the approximate matching of the current contour model can be implemented, that is, a position of the approximately matched current contour model may be slightly different from that of an actual or accurate current contour model. For example, as shown in a part (a) in FIG. 4, taking the circle in rectangular frame 1 as an example, the part (a) in FIG. 4 can be understood as an image formed by performing the affine transformation on the first circle in the reference contour model for the position of the spot inspection piece in the current image. Circle 11 is a circle at the first position that is obtained through matching based on the first circle of the reference contour model, and the circle is slightly different from the second circle. The second circle is a circle formed by connecting pixel points with significant pixel value changes, namely, the circle 1 of the current contour model, and in this case, it is necessary to perform fitting on the accurate second circle. After the second circle in the current contour model is subjected to fitting, the grayscale region can be learned. That is, the region outside the circle is the grayscale region corresponding to the circle.

When the current contour model is subjected to fitting, only the second circle of the current contour model needs to be obtained through fitting, to learn of parameters needed for testing the stability of the vision system, namely, the diameter of the circle and the grayscale value of the grayscale region, that is, the contour of the rectangular frame does not need fitting, which reduces time for obtaining the parameters needed for testing the stability of the vision system, thereby improving the efficiency of testing the stability of the vision system.

According to some embodiments of this application, optionally, the apparatus for testing stability of a vision system can obtain a plurality of pixel points with significant grayscale value changes in the current image based on a contour of the first circle, where the plurality of pixel points with significant grayscale value changes form the second circle.

Figure 4:
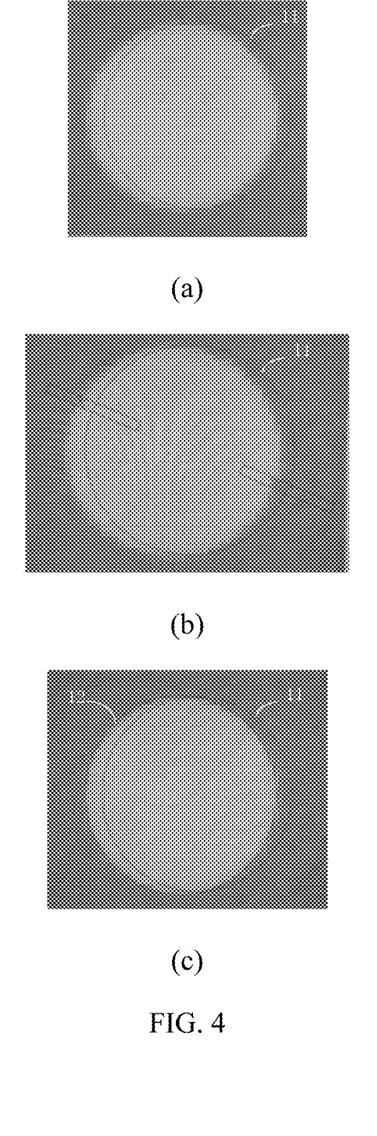
FIG. 4 is a schematic flowchart of performing fitting on a current contour model according to an embodiment of this application.

As shown in a part (b) and a part (c) in FIG. 4, circle 11 is a circle at the first position that is obtained through matching based on the first circle of the reference contour model. Pixel points with significant pixel value changes are searched for around the contour of circle 11 by using a rectangular strip, the pixel points are at the center of the rectangular strip, and then a plurality of found pixel points are connected to obtain an accurate second circle 22 through fitting.

Compared with a manner of directly obtaining pixel points with significant pixel changes in the current image, the manner of obtaining pixel points with significant pixel changes based on the contour of the first circle not only reduces the time required for obtaining the pixel points, but also increases the accuracy of obtaining the pixel points, thereby improving the efficiency and accuracy of fitting to obtain the second circle.

According to some embodiments of this application, optionally, the apparatus for testing stability of a vision system can obtain a diameter of the first circle based on the reference contour model; obtain a diameter of the second circle based on the current contour model; and determine, based on the diameter of the first circle and the diameter of the second circle, whether a camera position of the vision system has changed.

Because the reference contour model is used as a standard in this embodiment of this application, the diameter of the first circle is known. If the measured diameter of the second circle of the current contour model is different from the diameter of the first circle, it indicates that the caliper of the current vision system is lack of accuracy, thereby causing an inaccurate measurement result of the vision system. It can be understood that a value of each unit of the caliper under the standard is fixed, and each unit represents a size of one pixel. When the camera position is changed, the number of pixels in the target object is correspondingly changed compared with the number of pixels in the target object under the reference image. If the original standard is still used for calculation, a calculated result is different from an original size. Compared with a manner of using another dimension of the circle, for example, a perimeter, the manner of comparing the diameter of the first circle with the diameter of the second circle to determine whether the camera position of the vision system has changed is more intuitive and is conducive to a quick test of the stability of the vision system.

According to some embodiments of this application, optionally, if a difference between the diameter of the first circle and the diameter of the second circle is greater than a first threshold, the apparatus for testing stability of a vision system determines that the camera position has changed.

The first threshold represents a requirement index for measurement accuracy of the vision system. The smaller the first threshold, the higher the requirement for the measurement accuracy. For example, the first threshold may be 0.01 mm. If the difference between the diameter of the first circle and the diameter of the second circle is greater than 0.01 mm, it is determined that the camera position of the vision system has changed, that is, the vision system is unstable. If the difference between the diameter of the first circle and the diameter of the second circle is less than or equal to 0.01 mm, it is determined that the camera position of the vision system has not changed. Certainly, the first threshold may also be set to other values based on different requirements of different customers for measurement accuracy. This is not limited in this application. Setting the first threshold can satisfy different requirements of different customers for measurement accuracy.

According to some embodiments of this application, optionally, the apparatus for testing stability of a vision system can obtain a diameter of the second circle based on the current contour model in the following manner: calculating a size of each pixel based on the diameter of the first circle and the number of pixels included in the diameter of the first circle; obtaining the number of pixels included in the diameter of the second circle based on a contour of the second circle; and calculating the diameter of the second circle based on the number of pixels included in the diameter of the second circle and the size of each pixel.

In the vision system, the size of each pixel in reference is calculated by using a value of the diameter of the first circle in the reference image and the number of pixels included in the diameter. When the second circle in the current image is obtained through fitting, the diameter of the second circle can be directly obtained by counting the number of pixels included in the diameter of the second circle, so as to compare the diameter of the second circle with the diameter of the first circle and quickly determine whether the camera position of the vision system has changed, thereby testing the stability of the vision system. For example, assuming that the diameter of the first circle in the reference contour model is 2 mm and includes 10 pixels, a size of each pixel is 0.2 mm. In this case, the vision system measures the size based on the reference that each pixel is 0.2 mm. For example, the diameter of the second circle of the current contour model includes 20 pixels. If calculation is performed based on the reference, the diameter of the second circle is 4 mm, which is twice as great as the 2 mm diameter of the circle in the reference contour model. This situation can indicate that the measured value of the diameter of the circle is greater than the actual value of the diameter (reference) because the camera position of the vision system has changed. In this case, if the vision system is still used to measure the size of the target object, the measurement result is certainly inaccurate.

According to some embodiments of this application, optionally, the apparatus for testing stability of a vision system can obtain, based on the reference contour model, a first grayscale value of a grayscale region corresponding to the first circle; obtain, based on the current contour model, a second grayscale value of a grayscale region corresponding to the second circle; and determine, based on the first grayscale value and the second grayscale value, whether illumination in the vision system has changed.

Taking the first circle being the circle 1 in FIG. 3 as an example, the grayscale region corresponding to the first circle is a region outside the circle 1 in the rectangular frame 1, a grayscale value of the region is a first grayscale value, and the first grayscale value is used as a reference and may be compared with the second grayscale value at the same position under the current contour to determine whether the illumination of the vision system has changed. Currently, when a change in the illumination of the vision system is excessively great, size measurement is slightly affected. For example, when the illumination is excessively great, an edge of an image taken for a target object is recessed inward, and a measured size is smaller. The first grayscale value of the reference contour model is compared with the second grayscale value of the current contour model, which is conducive to testing of whether the illumination of the vision system has changed, so as to prevent excessively great illumination change, which otherwise affects the accuracy of the measurement result.

According to some embodiments of this application, optionally, when the apparatus for testing stability of a vision system determines, based on the first grayscale value and the second grayscale value, whether illumination in the vision system has changed, if a difference between the first grayscale value and the second grayscale value is greater than a second threshold, the apparatus for testing stability of a vision system determines that the illumination has changed.

The second threshold represents tolerance to an illumination environment in the vision system. The smaller the second threshold, the lower the tolerance to the illumination change of the vision system. Setting of the second threshold can satisfy different requirements of different customers for a change degree of the illumination environment of the vision system.

According to some embodiments of this application, optionally, the first position information and the second position information can include row information, column information, and angle information of the spot inspection piece, and the angle information is used to indicate the direction of the spot inspection piece.

The angle information may be an included angle between the spot inspection piece and X axis of the coordinate system, or an included angle between the spot inspection piece and Y axis of the coordinate system. The first position information and the second position information include not only the conventional row information and column information, but also the angle information indicating the direction of the spot inspection piece, so that approximate matching of the current contour model can be implemented during the affine transformation to obtain the accurate current contour model through fitting, regardless of how the spot inspection piece is placed before the reference contour model is stored, that is, it is unnecessary to place the spot inspection piece at a fixed angle each time before the stability of the vision system is tested, which is conducive to the quick testing of the stability of the vision system.

Figure 5:
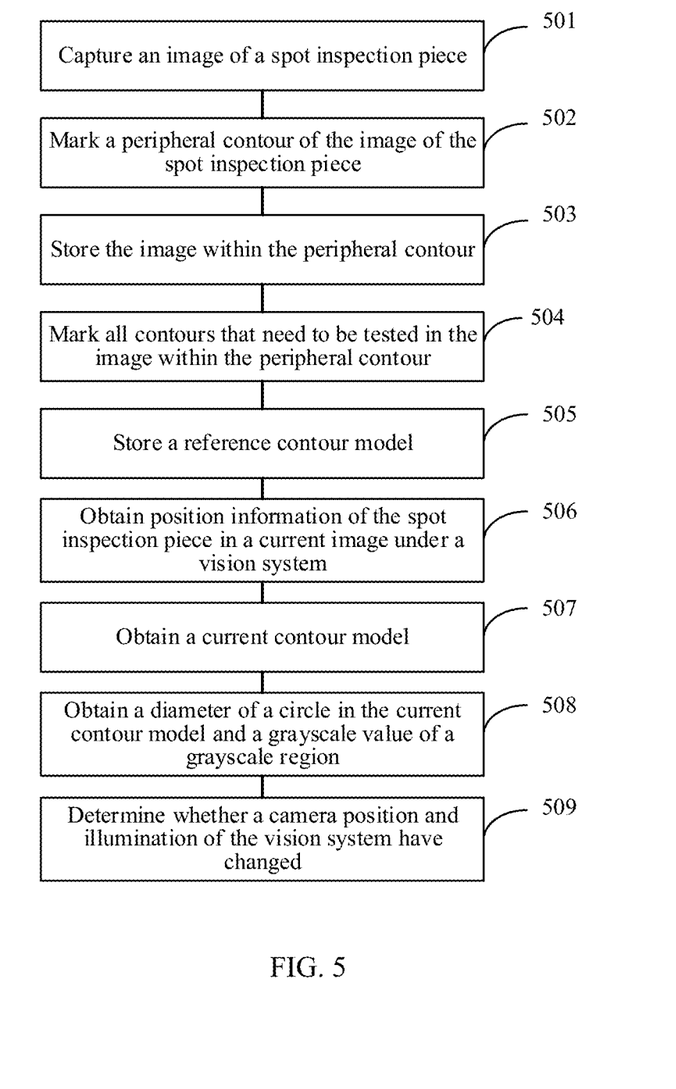
FIG. 5 is a schematic flowchart of another method for testing stability of a vision system according to an embodiment of this application.

In another optional embodiment, the method for testing stability of a vision system provided in an embodiment of this application can include a procedure 500 shown in FIG. 5, where the procedure 500 can include at least part of the contents. To facilitate understanding of the procedure 500, reference can be made to a schematic flowchart of testing stability of a vision system in FIG. 6.

501. An apparatus for testing stability of a vision system captures an image of a spot inspection piece. After the spot inspection piece has been prepared, an image of the spot inspection piece is captured through a camera of the vision system. For example, the image is the image shown in FIG. 3.

502. Mark a peripheral contour of the image of the spot inspection piece. As shown in a part (a) in FIG. 6, a white border line highlights the peripheral contour.

503. Store the image within the peripheral contour. As shown in a part (b) in FIG. 6, based on the peripheral contour, the image of the spot inspection piece is clipped, and the image within the peripheral contour is retained.

504. Mark all contours that need to be tested in the image within the peripheral contour. As shown in a part (c) in FIG. 6, all the contours are marked, including four rectangular contours and four circular contours.

505. Store the reference contour model. A combination of all contours that need to be tested in the image within the marked peripheral contour is used as the reference contour model, and the reference contour model is subjected to the affine transformation for an origin point. As shown in a part (d) in FIG. 6, a center point of the spot inspection piece is a center point of a pattern enclosed by four rectangles, an origin point of the coordinates is at an upper left corner, and therefore, when the reference contour model is subjected to the affine transformation for the origin point, only a rectangle and a circle in the second row and second column can be seen.

Figure 6:
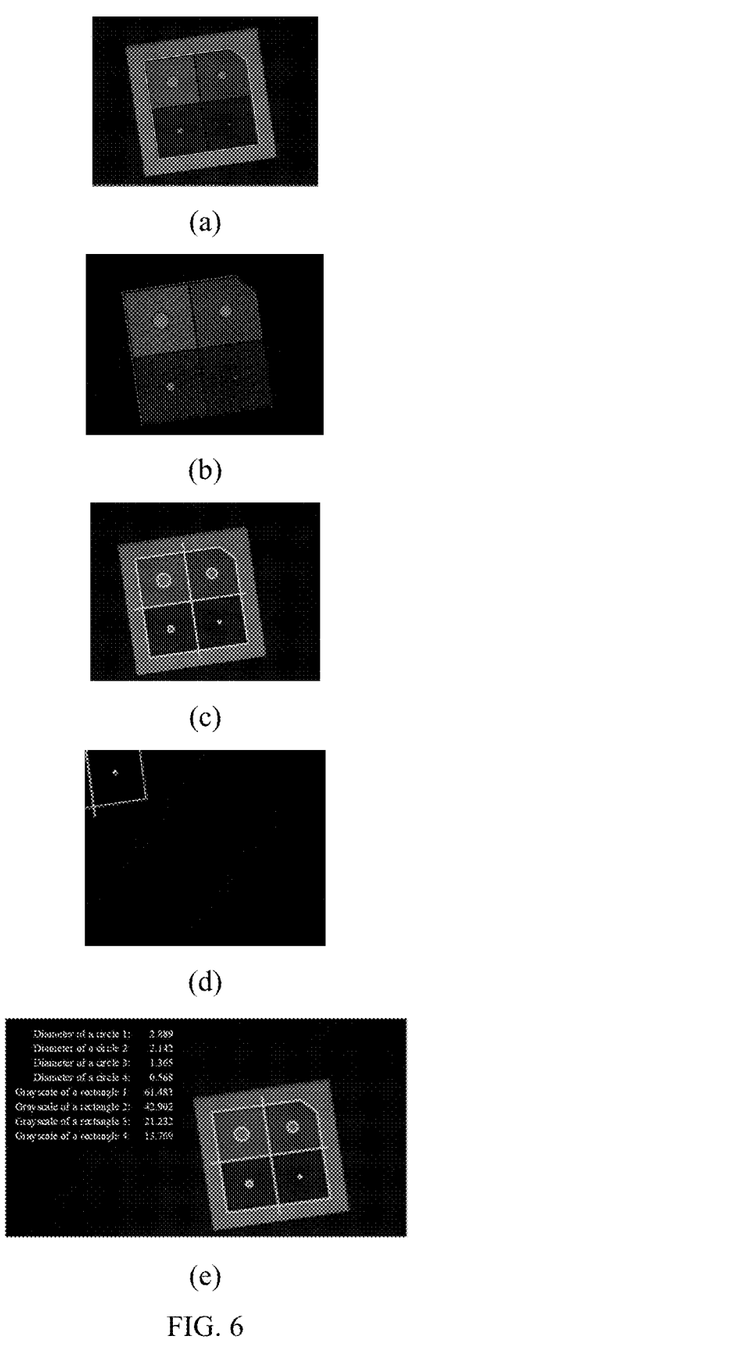
FIG. 6 is a schematic flowchart of another method for testing stability of a vision system according to an embodiment of this application.

506. Obtain position information of the spot inspection piece in the current image under the vision system. The spot inspection piece is captured by using the camera of the vision system, and is used as a current image. In addition, position information of the spot inspection piece in the current image of the vision system is obtained.

507. Obtain the current contour model. The reference contour model is subjected to the affine transformation for the position of the spot inspection piece in the current image based on the position information of the spot inspection piece in the current image, and fitting is performed to obtain a current contour model based on the reference contour model.

508. Obtain a diameter of the circle in the current contour model and a grayscale value of the grayscale region. An upper left corner of a part (e) in FIG. 6 shows a diameter of each circle and a grayscale value of a grayscale region in each rectangle that are finally measured.

509. Determine whether the camera position and the illumination of the vision system have changed. Specifically, it is determined, based on the first threshold and the difference between the diameter of the first circle and the diameter of the second circle, whether the camera position of the vision system has changed, and it is determined, based on the first grayscale value and the second grayscale value, whether the illumination of the vision system has changed.

In the method for testing stability of a vision system provided in this embodiment of this application, the reference contour model of the spot inspection piece is subjected to the affine transformation for the position of the spot inspection piece in the current image, so that the approximate matching of the current contour model can be implemented; and then the current contour model is subjected to accurate fitting, and the reference contour model is compared with the current contour model, so that it can be determined whether the stability of the vision system has changed, to report a fault in a timely manner in case of the change, thereby guaranteeing the accuracy of the testing result of the vision system.

The method embodiment of the embodiments of this application has been described in detail above, and the apparatus embodiment of the embodiments of this application is described below. The apparatus embodiment and the method embodiment correspond to each other, and therefore for content not described in detail, reference may be made to the previous method embodiment. The apparatus can implement any possible embodiment of the foregoing method.

Figure 7:
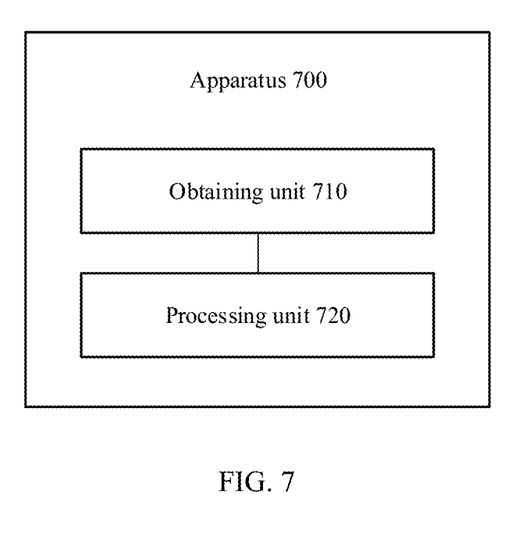
FIG. 7 is a schematic block diagram of a structure of an apparatus for testing stability of a vision system according to an embodiment of this application.

FIG. 7 is a schematic block diagram of an apparatus 700 for testing stability of a vision system according to an embodiment of this application. The apparatus 700 can perform the method for testing stability of a vision system in the foregoing embodiments of this application. For example, the apparatus 700 may be the foregoing controller 10.

As shown in FIG. 7, the apparatus includes:

an obtaining unit 710, configured to obtain first position information of a spot inspection piece in a current image under the vision system; and a processing unit 720, configured to: perform affine transformation on a reference contour model of the spot inspection piece for a position of the spot inspection piece in the current image based on the first position information, and obtain, through fitting, a current contour model of the spot inspection piece in the current image based on the reference contour model; and determine stability of the vision system based on the reference contour model and the current contour model.

According to some embodiments of this application, optionally, the obtaining unit 710 may be further configured to: obtain the reference contour model based on a reference image of the spot inspection piece; and obtain second position information of the spot inspection piece in the reference image; and the processing unit 720 may be further configured to perform affine transformation on the reference contour model of the spot inspection piece for the position of the spot inspection piece in the current image based on the first position information and the second position information.

According to some embodiments of this application, optionally, the spot inspection piece can include at least one rectangular frame, and each rectangular frame can include a circle and a grayscale region outside the circle; and the reference contour model and the current contour model include contours of the rectangular frame and the circle.

According to some embodiments of the application, optionally, a plurality of rectangular frames may be present, a plurality of circles corresponding to the plurality of rectangular frames have different diameters, and a plurality of grayscale regions corresponding to the plurality of rectangular frames have different grayscale values.

According to some embodiments of this application, optionally, one rectangular frame in the spot inspection piece may include a notch, and the notch is configured to indicate a direction of the spot inspection piece.

According to some embodiments of this application, optionally, the processing unit 720 may be further configured to obtain, through fitting, a second circle of the current contour model based on a first circle in the reference contour model.

According to some embodiments of this application, optionally, the obtaining unit 710 may be further configured to obtain a plurality of pixel points with significant grayscale value changes in the current image based on a contour of the first circle, where the plurality of pixel points with significant grayscale value changes form the second circle.

According to some embodiments of this application, optionally, the obtaining unit 710 may be further configured to: obtain a diameter of the first circle based on the reference contour model, and obtain a diameter of the second circle based on the current contour model; and the processing unit 720 may be further configured to determine, based on the diameter of the first circle and the diameter of the second circle, whether a camera position of the vision system has changed.

According to some embodiments of this application, optionally, the processing unit 720 may be further configured to: if a difference between the diameter of the first circle and the diameter of the second circle is greater than a first threshold, determine that the camera position has changed.

According to some embodiments of this application, optionally, the processing unit 720 may be further configured to calculate a size of each pixel based on the diameter of the first circle and the number of pixels included in the diameter of the first circle; the obtaining unit 710 may be further configured to obtain the number of pixels included in the diameter of the second circle based on a contour of the second circle; and the processing unit 720 may be further configured to calculate the diameter of the second circle based on the number of pixels included in the diameter of the second circle and the size of each pixel.

According to some embodiments of this application, optionally, the obtaining unit 710 may be further configured to: obtain, based on the reference contour model, a first grayscale value of a grayscale region corresponding to the first circle, and obtain, based on the current contour model, a second grayscale value of a grayscale region corresponding to the second circle; and the processing unit 720 may be further configured to determine, based on the first grayscale value and the second grayscale value, whether illumination in the vision system has changed.

According to some embodiments of this application, optionally, the processing unit 720 may be further configured to: if a difference between the first grayscale value and the second grayscale value is greater than a second threshold, determine that the illumination has changed.

According to some embodiments of this application, optionally, the first position information and the second position information can include row information, column information, and angle information of the spot inspection piece, and the angle information is used to indicate the direction of the spot inspection piece.

Figure 8:
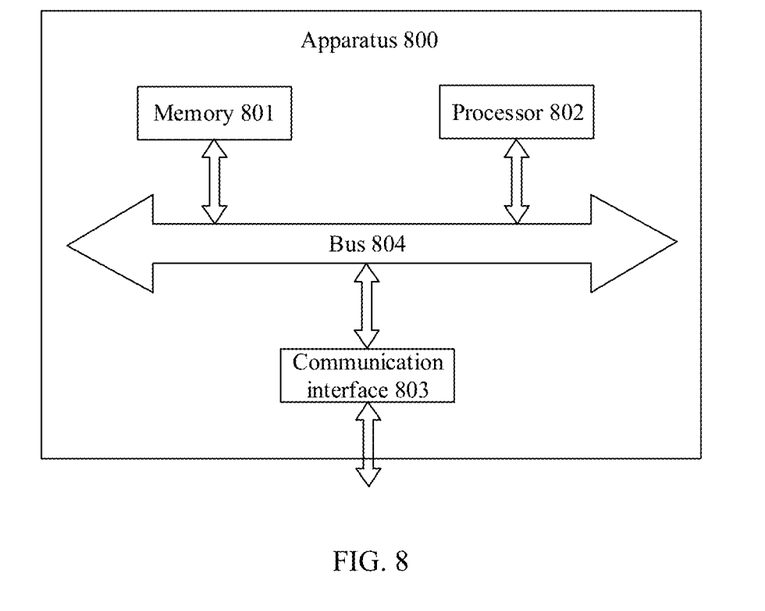
FIG. 8 is a schematic diagram of a hardware structure of an apparatus for testing stability of a vision system according to an embodiment of this application.

FIG. 8 is a schematic diagram of a hardware structure of an apparatus for testing stability of a vision system according to an embodiment of this application. The apparatus 800 for testing stability of a vision system shown in FIG. 7 includes a memory 801, a processor 802, a communication interface 803, and a bus 804. The memory 801, the processor 802, and the communication interface 803 are connected to each other via the bus 804.

The memory 801 may be a read-only memory (read-only memory, ROM), a static storage device, or a random access memory (random access memory, RAM). The memory 801 may store a program. When the program stored in the memory 801 is executed by the processor 802, the processor 802 and the communication interface 803 are configured to perform the steps of the method for detecting stability of a version system of the embodiments of this application.

The processor 802 may be a general-purpose central processing unit (central processing unit, CPU), a microprocessor, an application specific integrated circuit (application specific integrated circuit, ASIC), a graphics processing unit (graphics processing unit, GPU), or one or more integrated circuits, and is configured to execute a related program so as to implement the functions required by the units in the apparatus for testing stability of a vision system of this embodiment of this application, or perform the method for detecting stability of a version system of the embodiments of this application.

The processor 802 may alternatively be an integrated circuit chip with a signal processing capability. During implementation, the steps of the method for detecting stability of a version system in the embodiments of this application can be completed by hardware integrated logic circuits in the processor 802 or instructions in the form of software.

The processor 802 may alternatively be a general-purpose processor, a digital signal processor (digital signal processor, DSP), an ASIC, a field programmable gate array (field programmable gate array, FPGA) or another programmable logic device, a discrete gate or transistor logic device, or a discrete hardware component. The methods, steps, and logical block diagrams disclosed in the embodiments of this application can be implemented or performed. The general-purpose processor may be a microprocessor, or the processor may alternatively be any conventional processor or the like. Steps of the methods disclosed with reference to the embodiments of this application may be directly performed and completed by using a hardware processor, or may be performed and completed by using a combination of hardware in the processor and a software module. The software module may be located in a storage medium mature in the art, such as a random access memory, a flash memory, a read-only memory, a programmable read-only memory or an electrically erasable programmable memory, or a register. The storage medium is located in the memory 801. The processor 802 reads information in the memory 801, and completes, together with hardware of the processor 802, the functions required by the units in the apparatus for testing stability of a vision system of this embodiment of this application, or performs the method for detecting stability of a version system of the embodiments of this application.

The communication interface 803 implements communication between the apparatus 800 and other devices or communication networks by using a transceiver apparatus such as but not limited to a transceiver. For example, traffic data of an unknown device may be obtained through the communication interface 803.

The bus 804 may include a path for transferring information between various components of the apparatus 800 (for example, the memory 801, the processor 802, and the communication interface 803).

It should be noted that although only the memory, the processor, and the communication interface of the apparatus 800 are shown, in specific implementation, persons skilled in the art should understand that the apparatus 800 may further include other components necessary for normal operation. In addition, persons skilled in the art should understand that based on specific needs, the apparatus 800 may further include a hardware component for implementing other additional functions. In addition, persons skilled in the art should understand that the apparatus 800 may include only components necessary for implementing the embodiments of this application, and does not necessarily include all the components shown in FIG. 8.

An embodiment of this application further provides a computer-readable storage medium. The medium stores program code to be executed by a device. The program code includes instructions for performing the steps of the foregoing method for detecting stability of a version system.

An embodiment of this application further provides a computer program product. The computer program product includes a computer program stored in a computer-readable storage medium, and the computer program includes program instructions. When the program instructions are executed by a computer, the computer is enabled to perform the foregoing method for detecting stability of a version system.

The computer-readable storage medium may be a transitory computer-readable storage medium, or a non-transitory computer-readable storage medium.

It may be clearly understood by persons skilled in the art that, for the purpose of convenient and brief description, for a detailed working process of the foregoing apparatus, reference may be made to a corresponding process in the foregoing method embodiments, and details are not described again herein.

Although this application has been described with reference to some preferred embodiments, various modifications to this application and replacements of the components therein with equivalents can be made without departing from the scope of this application. In particular, as long as there is no structural conflict, the various technical features mentioned in the embodiments can be combined in any manner. This application is not limited to the specific embodiments disclosed in this specification but includes all technical solutions falling within the scope of the claims.

What is claimed is:

1. A method for testing stability of a vision system, characterized by comprising:
    obtaining first position information of a spot inspection piece in a current image under the vision system;
    performing an affine transformation on a reference contour model of the spot inspection piece for a position of the spot inspection piece in the current image based on the first position information, and obtaining, through fitting, a current contour model of the spot inspection piece in the current image based on the reference contour model; and
    determining stability of the vision system based on the reference contour model and the current contour model,
    wherein the spot inspection piece comprises at least one rectangular frame, and each rectangular frame comprises a circle and a grayscale region outside the circle, and
    wherein the reference contour model and the current contour model comprise contours of the rectangular frame and the circle.

2. The method according to claim 1, wherein before performing the affine transformation on a reference contour model of the spot inspection piece for a position of the spot inspection piece in the current image, the method further comprises:
    obtaining the reference contour model based on a reference image of the spot inspection piece; and
    obtaining second position information of the spot inspection piece in the reference image;
    wherein performing the affine transformation on a reference contour model of the spot inspection piece for a position of the spot inspection piece in the current image comprises:
    performing the affine transformation on the reference contour model of the spot inspection piece for the position of the spot inspection piece in the current image based on the first position information and the second position information.

3. The method according to claim 1, wherein a plurality of rectangular frames are present, a plurality of circles corresponding to the plurality of rectangular frames have different diameters, and a plurality of grayscale regions corresponding to the plurality of rectangular frames have different grayscale values.

4. The method according to claim 1, wherein one rectangular frame in the spot inspection piece comprises a notch, and the notch is configured to indicate a direction of the spot inspection piece.

5. The method according to claim 1, wherein the obtaining, through fitting, a current contour model based on the reference contour model comprises:
    obtaining, through fitting, a second circle of the current contour model based on a first circle in the reference contour model.

6. The method according to claim 5, wherein the obtaining, through fitting, a second circle of the current contour model based on a first circle in the reference contour model comprises:
    obtaining a plurality of pixel points with significant grayscale value changes in the current image based on a contour of the first circle, wherein the plurality of pixel points with significant grayscale value changes form the second circle.

7. The method according to claim 5, wherein the determining stability of the vision system based on the reference contour model and the current contour model comprises:
    obtaining a diameter of the first circle based on the reference contour model;
    obtaining a diameter of the second circle based on the current contour model; and
    determining, based on the diameter of the first circle and the diameter of the second circle, whether a camera position of the vision system has changed.

8. The method according to claim 7, wherein the determining, based on the diameter of the first circle and the diameter of the second circle, whether a camera position of the vision system has changed comprises:
    if a difference between the diameter of the first circle and the diameter of the second circle is greater than a first threshold, determining that the camera position has changed.

9. The method according to claim 7, wherein the obtaining a diameter of the second circle based on the current contour model comprises:
    calculating a size of each pixel based on the diameter of the first circle and the number of pixels comprised in the diameter of the first circle;
    obtaining the number of pixels comprised in the diameter of the second circle based on a contour of the second circle; and
    calculating the diameter of the second circle based on the number of pixels comprised in the diameter of the second circle and the size of each pixel.

10. The method according to claim 7, wherein the determining stability of the vision system based on the reference contour model and the current contour model further comprises:
    obtaining, based on the reference contour model, a first grayscale value of a grayscale region corresponding to the first circle;
    obtaining, based on the current contour model, a second grayscale value of a grayscale region corresponding to the second circle; and
    determining, based on the first grayscale value and the second grayscale value, whether illumination in the vision system has changed.

11. The method according to claim 10, wherein the determining, based on the first grayscale value and the second grayscale value, whether illumination in the vision system has changed comprises:

if a difference between the first grayscale value and the second grayscale value is greater than a second threshold, determining that the illumination has changed.

12. The method according to claim 1, wherein the first position information and the second position information comprise row information, column information, and angle information of the spot inspection piece, and the angle information is used to indicate the direction of the spot inspection piece.

13. An apparatus for testing stability of a vision system, comprising a processor and a memory, wherein the memory is configured to store a program, and the processor is configured to call and run the program from the memory to perform the method for testing stability of a vision system according to claim 1.

14. A non-transitory computer-readable storage medium, comprising a computer program, wherein when the computer program runs on a computer, the computer is enabled to perform the method for testing stability of a vision system according to claim 1.

* * * * *